Figure 1:
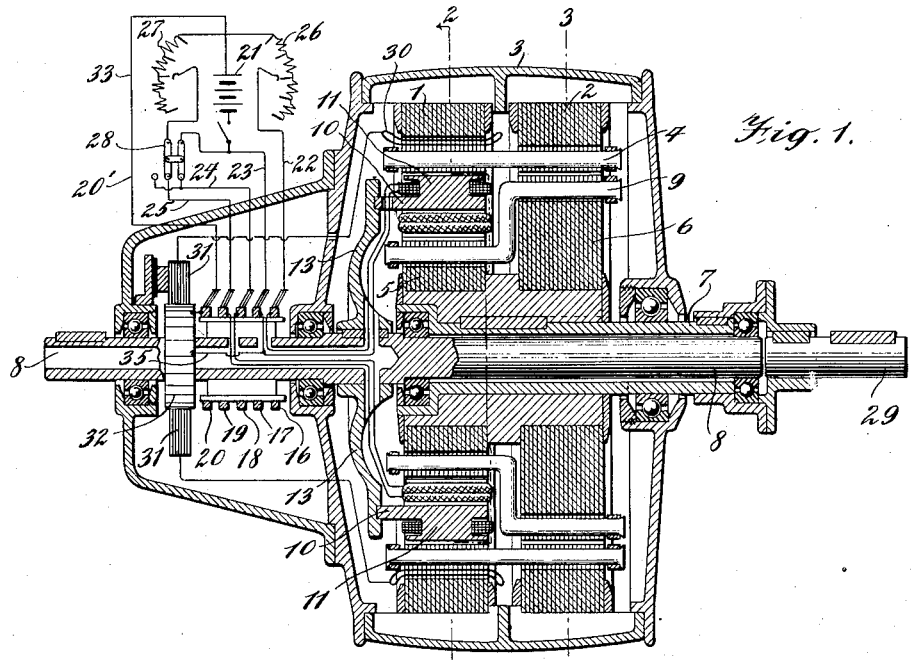

A. H. NEULAND.
METHOD OF AND APPARATUS FOR TRANSMITTING POWER.
APPLICATION FILED JULY 31, 1915.

1,246,643.

Patented Nov. 13, 1917.
2 SHEETS—SHEET 1.

WITNESS

INVENTOR.
Alfons H. Neuland
BY
Rosenbaum, Stockbridge & Borst
ATTORNEYS.

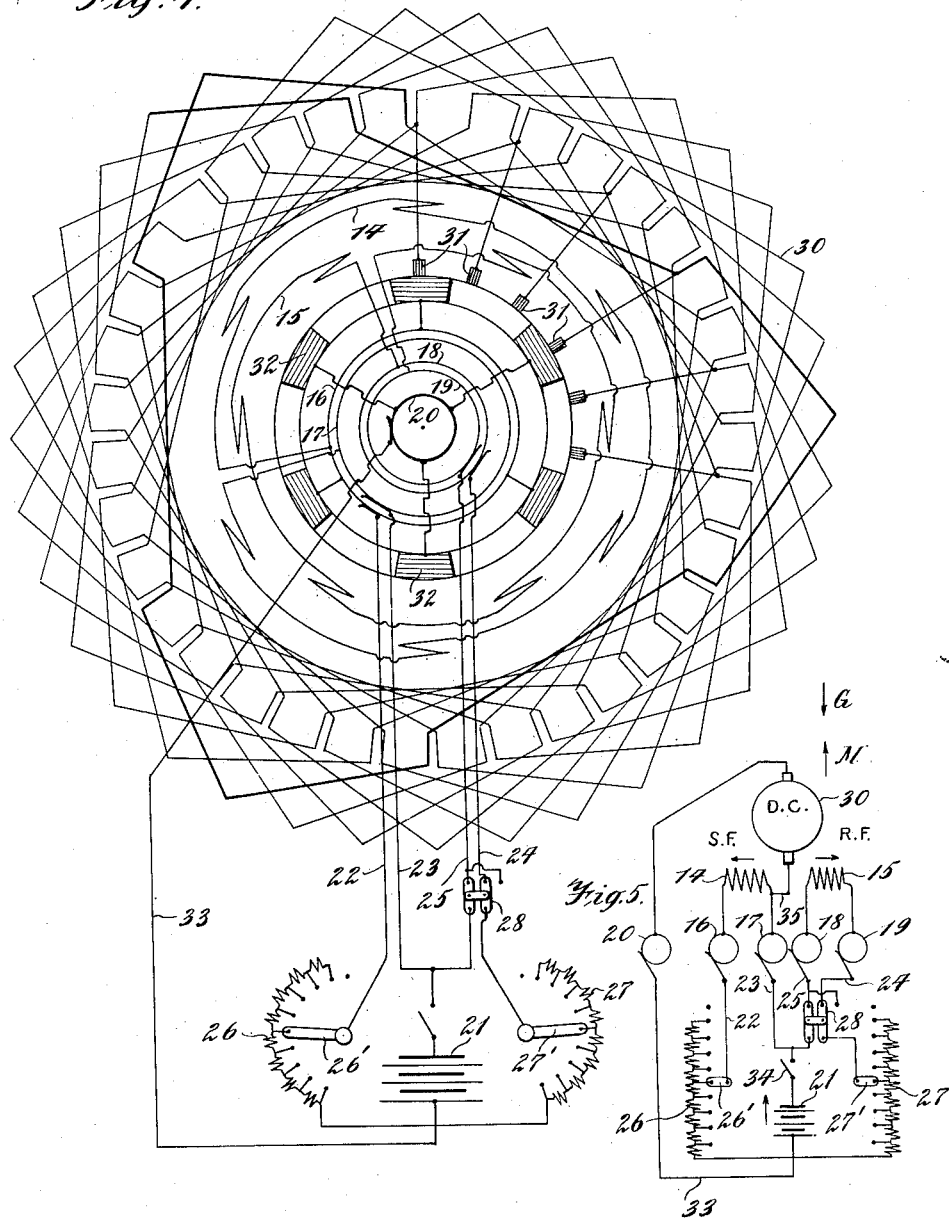

UNITED STATES PATENT OFFICE.

ALFONS H. NEULAND, OF NEW YORK, N. Y.

METHOD OF AND APPARATUS FOR TRANSMITTING POWER.

1,246,643. Specification of Letters Patent. Patented Nov. 13, 1917.

Application filed July 31, 1915. Serial No. 43,007.

*To all whom it may concern:*

Be it known that I, ALFONS H. NEULAND, a subject of the Czar of Russia, residing at New York city, in the borough of Manhattan and State of New York, have invented certain new and useful Improvements in Methods of and Apparatus for Transmitting Power, of, which the following is a full, and stator circuits.

My invention relates to the method of and the apparatus for transmitting power, and particularly to electro-magnetic power transmission devices for transmitting power from one rotating element, such as a shaft, to another rotatable element. Such power transmission devices embodying my invention may also be adapted as direct current motors, and when used to transmit power from an internal combustion engine or other prime mover which is not self-starting, they are susceptible of use as a starter for the prime mover.

One of the leading and most important features of devices embodying my invention is the fact that the torque produced on the driven member exceeds that of the driver. In my co-pending application Serial No. 870,785, filed November 7, 1914, I have shown and described a power transmission device possessing this characteristic, which device has two stationary elements provided with inter-connected windings and two mechanically connected rotors coöperative with the respective stators and provided with inter-connected windings, the first rotor and stator pair being separated by a rotative field in inductive relation to both windings, and the second pair being arranged with their windings in co-active relation. As described in the said application, the field member is the driver or driving member, being connected to the prime mover, while the rotor elements, which are fixed to a common shaft, constitute the driven member. The revolving field acting on the first stator winding, generates a polyphase current therein, which flows in the second stator winding and produces a revolving field therein. The revolving field also generates a polyphase current in the first rotor winding which flows in the second rotor winding and produces a revolving field therein. The two revolving fields of the second pair have equal velocity and the windings are so arranged that the two fields have quadrature relation, whereby a torque is produced on the second rotor element.

Another torque is produced upon the driven member by the reaction between the driving field and the generated rotor current in the first rotor, which torque adds itself to the torque of the second rotor so long as the field and rotor elements rotate in the same direction.

The torque of the driven member greatly exceeds that of the driver, due to the fact that the first rotor and stator pair, which may be termed the generating rotor and stator elements, are operating practically on short circuit, and hence the current in the second rotor and stator pair is very high with strong excitation of the driving field. In other words, the generated currents in the rotor and stator circuits are many times the normal value, the power factor of these currents being very low, and they can therefore be produced with the application of only normal torque. The low power factor of these currents does not prevent the production of a torque of many times the normal value, on the second rotor element, because, irrespective of what the power factor is, so long as the power factor of the rotor and stator currents is the same, the two are in quadrature; that is, in a position where they produce maximum torque.

The rotation of the driven member is reversed by reversing either all stator or all rotor poles of the second pair. The pull on the second rotor is then in the opposite direction, but the resultant torque on the driven member is somewhat less since the torque on the first rotor element must be subtracted from that on the second. The speed and torque of the driven member may be controlled by varying the voltage relation between the two pairs of elements, as by inserting an auto-transformer in one of the circuits between the two elements of the circuit. In such a machine only one of the two circuits can be a straight bar squirrel-cage winding, while the winding of the other circuit must be such that the poles of one of the elements may be reversed with respect to the poles of the second element in order to reverse the direction of rotation of the driven member.

One of the objects of my present invention is to provide a power transmission device having the advantages above referred to as to the production of the increased torque on the driven member, but the speed of which may be varied and the direction of rotation reversed without manipulating the power leads, whereby squirrel-cage straight bar windings may be used for both the rotor and stator circuits.

Another object is to provide for a combination of a power transmission device, an engine starter and battery charger.

Another object is to provide simple, convenient and reliable means for regulating the speed and torque of the machine, and for reversing the direction of rotation of the driven member.

Another object is to provide means for generating current in the stator and rotor circuits in quadrature to each other with straight stator and rotor coils.

Other objects are simplicity, strength and durability of construction. Still other objects and advantages of my invention will appear from the following description.

This invention is characterized by the provision of two independent magnetic fields, one acting on the stator and the other on the rotor, together with means for regulating the relative strength of the two fields, for the purpose of adjustment and means for simultaneously varying the strength of the two fields to obtain a large starting and accelerating torque at low speeds and for varying the torque and speed of the driven member. My invention also includes means for reversing the polarity of one field relative to that of the other in order to reverse the machine.

In the preferred form the two fields are carried by a magnetic ring, the field magnets being arranged on opposite sides thereof, and the external magnets are disposed intermediate of the internal magnets, whereby the two generated currents have quadrature relation. This construction permits of the use of squirrel-cage straight bar windings, since the regulation may be effected by controlling the field currents, and when the generated stator and rotor currents are conducted through the straight bars to the second pair of elements, they produce therein two revolving fields in quadrature to each other.

My invention also includes various other details of construction and arrangements and combinations of parts, as will hereinafter more fully appear.

I shall now describe the illustrated embodiments of my invention and shall thereafter point out my invention in claims.

Figure 2:
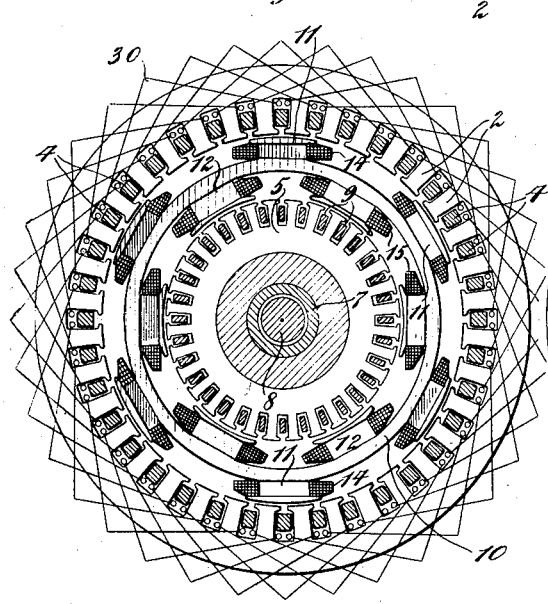
Figure 3:
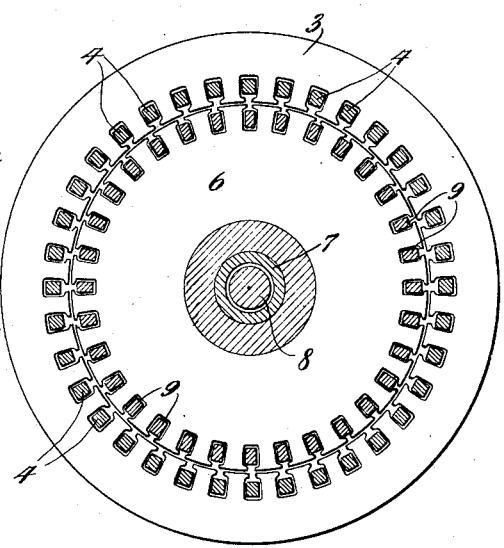

Figure 1 is a longitudinal central section of a machine embodying my invention and adapted as a power transmission device, together with a diagram of the field controlled circuits;

Figs. 2 and 3 are transverse vertical sections of the same on the lines 2—2 and 3—3, respectively, of Fig. 1;

Figs. 4 and 5 are diagrams of the electrical circuits, Fig. 5 being arranged to illustrate the operation of the device as a starter and as a generator.

As illustrated, the stator and rotor are each composed of two slightly separated elements, thereby forming two electro-magnetic units or structures, each including a stator element and a rotor element, the two elements of the first structure being separated by a rotatable field member, while in the second structure they are separated only by a narrow air gap. The two stator elements 1 and 2 are annular laminated members carried on the inner wall of the casing 3, and are coaxially arranged, the two elements being axially spaced.

The two stator elements are provided with the same number of equally spaced slots on their inner peripheries, the slots of the two elements being in line with each other, and the two elements are connected by conductor bars 4 which are disposed in these slots and are electrically connected at their ends by suitable rings, or are otherwise short circuited, after the manner of a squirrel-cage winding. The two rotor elements 5 and 6 are disposed concentrically within the two stator elements and are mounted upon and secured to the sleeve 7, which is provided with suitable bearings and surrounds the driving shaft 8. The two rotor elements are also connected by conductor bars 9 disposed in peripheral slots in the two elements, and electrically connected at their ends, forming a squirrel-cage winding.

The rotor elements with their sleeves 7 and squirrel-cage winding constitute the driven member, while the field member which is secured to the shaft 8 forms the driving member or driver. The field member comprises a steel ring 10, which is provided with a series of six equally spaced external polar projections 11, and the same number of equally spaced internal polar projections 12, which are disposed intermediate the external polar projections. The portions of the ring extending between the polar projections form magnetic yokes connecting the pole faces on one side with the adjacent pole faces on the other side. At its outer edge the ring 10 is attached to a spider 13 of magnetic material, which is keyed or otherwise secured to the driving shaft 8. A stator field winding 14 is provided upon the external polar projections and a rotor field winding 15 is provided upon the internal polar projections, these windings being so arranged as to form alternately opposite poles, as indicated in Fig. 4, and the stator field winding is electrically connected to two slip rings 16 and 17, and the rotor field winding is connected to slip rings 18 and 19 on the driving shaft 8. A fifth slip ring 20 is also provided on the shaft 8, for a purpose which will hereinafter appear.

The controller circuit for the two fields is illustrated diagrammatically in Figs. 1 and 4. The source of magnetizing current is shown as a battery 21, and the stator field is connected therewith by wires 22 and 23, which are connected to brushes engaging the slip rings 16 and 17, and the rotor field is connected to the battery 21 by wires 24 and 25 which connect with brushes engaging the slip rings 18 and 19. To vary the strength of the respective fields, rheostats 26 and 27 are provided in the respective controller circuits, while to reverse the relative direction of the two magnetizing currents a pole changer 28 is provided in one of the circuits, shown as the rotor field circuit.

The driver shaft 8 is connected to the prime mover, while the sleeve 7 is connected by a suitable coupling to the driven shaft 29. When the rotor and stator fields are both energized and the field member is rotated, a polyphase current is generated in both of the stator and rotor windings 4 and 9. These generated polyphase currents circulating in the windings 4 and 9 set up revolving fields in the elements 2 and 6 of the second structure, both of which have the same direction of rotation as that of the field member, and since the rotor field magnets are intermediate of the stator field magnets, it is apparent that these two revolving fields will have quadrature relation to each other and will produce a torque upon the rotor element 6, the direction of which depends upon the relative positions of the poles of the two elements. It will be seen, therefore, that although there are two revolving fields, the torque produced by the stator on the rotor in either direction of rotation is similar to the effect which would be obtained by stationary poles, in so far as directions of rotation and magnitude of the torque are concerned.

The direction of rotation is determined by the direction of torque of the second rotor element. The apparatus is so proportioned that the magnetic density of the second structure is very high, and is so arranged that the two fields are not in line with each other, but are electrically at right angles to each other, and therefore only a small counter potential is generated. The rotor windings being of very low resistance, consume only a small part of the generated potential. The current in the rotor windings is therefore very high and reacts upon the comparatively weak rotor field of the field member. This causes the power factor of the generated current to be very low, thus enabling the driver or the prime mover to produce large quantities of current with the application of only a small or normal torque. The same is true of the stators and their windings. These low power currents in the rotor and stator of the second structure develop a torque in keeping with these large currents because the currents have quadrature relation to each other, which is the proper relation for the development of the highest torque.

Due to the fact that the torque in the second structure exceeds many times the torque in the first structure, the apparatus is made to operate in either direction without changing the direction of rotation of the prime mover. The direction of rotation is determined by the relative polarity of the fields of the second structure, and this relation is determined by the relative polarity of the rotor and stator fields of the field member, which in turn is determined by the position of a pole changer in one of the field circuits, the shifting of which, in the illustrated construction, reverses the exciting current of the rotor field and hence the generated rotor current.

As appears from the diagram of Fig. 4, the two field circuits may be varied in intensity by adjusting the rheostat handles 26' and 27', respectively, and the relative polarity of the two fields may be reversed by means of the pole changer 28. To start the device the strength of the two fields is gradually increased until sufficient torque is developed to cause the driven member to rotate, and thereafter the resistances are gradually cut out from the two fields, whereby the torque upon the rotor is increased and the speed of the driven member is caused to pick up.

If it is desired to vary the relative strength of the two fields, this may be done through the medium of the independently operable rheostats. Such manipulation is desirable when the driven member is operating in reverse direction from that of the driver, in order to keep the power factor in the first rotor element at a minimum. It may also be employed to change the power factor of the rotor and stator currents of the second structure, thereby shifting one field with respect to the other, and serving as an additional means for controlling the torque and speed.

As previously stated, the device embodies a combination of a power transmission, engine starter and battery charger, when used as a transmission for automobiles or in connection with other prime movers which are not self-starting. This use of the device appears from the diagram of Fig. 5. A winding 30 is employed on the first stator element 1, and is connected to stationary brushes 31 engaging a commutator 32 on the shaft 8. The commutator is electrically connected to the battery 21, being connected at three points to the slip ring 20, which is engaged by a brush connected to the battery 21 through the wire 33.

To start the engine the battery 21 is connected into the circuit by closing a controlling switch 34. The stator field winding is then energized through the wire 23, slip ring 17 and stator field winding, slip ring 16, wire 22, and rheostat 26, back to the battery, the rotor field circuit being opened at the rheostat 27. The stator winding 30 is energized through wire 23, slip ring 17, wire 35, the commutator 32 and stator winding 30, slip ring 20 and wire 33, back to the battery. The direct current from the battery is thus fed through the stator field winding in the direction indicated by the arrow in Fig. 5, and also through the stator winding in the direction marked by the arrow M, thus causing the field member to rotate and start the engine.

After the engine is started the device acts as a generator, and is thus rendered self-exciting for power transmission purposes, the generated current being utilized to energize the two fields and also to charge the battery 21, if desired, in which case the switch 34 will be closed, or the battery may be disconnected by opening the switch 34. It will be observed that the generated current which is in the direction of the arrow G of Fig. 5, is in the proper direction to perform these two functions, flowing in the fields in the direction of the arrows and flowing through the battery in the direction opposite to that in which the current flows when the battery is discharging.

It is obvious that various modifications may be made in the construction shown in the drawings, and above particularly described, within the principle and scope of my invention.

I claim:

1. An electro-magnetic power transmission device comprising a driven rotor member having an induced winding thereon of relatively low resistance, a stator member having an induced winding thereon of relatively low resistance arranged in co-active relation to the rotor winding, a rotative driving magnetic field member having a relatively weak stator field component acting on the stator winding and a relatively weak rotor field component acting on the rotor winding, whereby low power factor currents are produced in both windings which coact to produce a torque on the driven winding exceeding that of the driver, and means for reversing the direction of the flux of one field component relative to that of the other field component.

2. An electro-magnetic power transmission device comprising a driven rotor member having an induced winding thereon, a stator member having an induced winding thereon arranged in co-active relation to the rotor winding, and a rotative driver having a plurality of stator magnetic poles in inductive relation to the stator winding and a plurality of rotor magnetic poles in inductive relation to the rotor winding, the stator poles being intermediate of those of the rotor poles whereby the generated currents in the co-active windings are relatively angularly displaced.

3. An electro-magnetic power transmission device comprising a driven rotor member having an induced winding thereon of relatively low resistance, a stator member having an induced winding thereon of relatively low resistance arranged in co-active relation to the rotor winding, a rotative driver having a plurality of stator magnetic poles in inductive relation to the stator winding and a plurality of rotor magnetic poles in inductive relation to the rotor winding, means for supplying the rotor and stator poles independently with a relatively weak magnetizing current, whereby a torque is produced upon the rotor exceeding that of the driver, and means for reversing the magnetizing current of one set of poles.

4. An electro-magnetic power transmission device comprising a driven rotor member having an induced winding thereon of relatively low resistance, a stator member having an induced winding thereon of relatively low resistance arranged in co-active relation to the rotor winding, a rotative driver having a plurality of stator magnetic poles arranged to form a stator field in inductive relation to the stator winding, a plurality of rotor magnetic poles arranged to form a rotor field in inductive relation to the rotor winding, means for supplying magnetizing current to the two fields, and means for varying the relative strength of the two fields.

5. An electro-magnetic power transmission device comprising a driven rotor member having an induced winding thereon of relatively low resistance, a stator member having an induced winding thereon of relatively low resistance arranged in co-active relation to the rotor winding, a rotative driver having a plurality of stator magnetic poles arranged to form a stator field in inductive relation to the stator winding, a plurality of rotor magnetic poles arranged to form a rotor field in inductive relation to the rotor winding, means for supplying magnetizing current to the two fields, means for reversing the magnetizing current of one field, and means for varying the relative strength of the two fields.

6. An electro-magnetic power transmission device comprising a driven rotor member having an induced winding thereon of relatively low resistance, a stator member having an induced winding thereon of relatively low resistance arranged in co-active relation to the rotor winding, a rotative driver including a magnetic ring having on one face a plurality of stator magnetic poles in inductive relation to the stator winding and on another face a plurality of rotor magnetic poles in inductive relation to the rotor winding, means for supplying the rotor and stator poles independently with a relatively weak magnetizing current, whereby a torque is produced upon the rotor exceeding that of the driver, and means for reversing the magnetizing current of one set of poles.

7. An electro-magnetic power transmission device comprising a stator member having two stator elements, a squirrel-cage winding connecting the two stator elements, a driven rotor member having two mechanically connected rotor elements arranged concentrically of the stator elements, a squirrel-cage winding connecting the two rotor elements, the second rotor and stator elements being arranged with their windings in co-active relation, a rotative driver arranged between the first rotor and stator elements and including means for producing a relatively weak magnetic field acting on both windings, whereby low power factor currents are produced in both windings which coact with the second rotor and stator elements to produce a torque in the driven rotor member exceeding that of the driver, and means for reversing the direction of the current generated in one winding.

8. An electro-magnetic power transmission device comprising a stator member having two stator elements, a squirrel-cage winding connecting the two stator elements, a driven rotor member having two mechanically connected rotor elements arranged concentrically of the stator elements, a squirrel-cage winding connecting the two rotor elements, the second rotor and stator elements being arranged with their windings in co-active relation, and a rotative driving magnetic field member arranged between the first rotor and stator elements having a relatively weak stator field component acting on the stator winding and a relatively weak rotor field component acting on the rotor winding, whereby low power factor currents are produced in both windings which coact with the second rotor and stator to produce a torque on the driven rotor member exceeding that of the driver.

9. An electro-magnetic power transmission device comprising a stator member having two stator elements, a squirrel-cage winding connecting the two stator elements, a driven rotor member having two mechanically connected rotor elements arranged concentrically of the stator elements, a squirrel-cage winding connecting the two rotor elements, the second rotor and stator elements being arranged with their windings in co-active relation, a rotative driving magnetic field member arranged between the first rotor and stator elements having a relatively weak stator field component acting on the stator winding and a relatively weak rotor field component acting on the rotor winding, whereby low power factor currents are produced in both windings which coact with the second rotor and stator to produce a torque on the driven rotor member exceeding that of the driver, and means for reversing the direction of the flux of one field component relative to that of the other field component.

10. In a dynamo-electric machine, a field member having a plurality of external pole pieces and a plurality of internal pole pieces arranged intermediate of the external pole pieces, the successive poles of each set being of opposite polarity, and magnetic yokes connecting each internal pole face of the external pole pieces with the respectively adjacent external pole face of the internal pole pieces.

11. In a dynamo-electric machine, a field member having a plurality of external pole pieces and a plurality of internal pole pieces arranged intermediate of the external pole pieces, the successive poles of each set being of opposite polarity, magnetic yokes connecting each internal pole face of the external pole pieces with the respectively adjacent external pole face of the internal pole pieces, and means for reversing the polarity of the poles of one set.

12. An electro-magnetic power transmission device comprising a stator member having two stator elements, a squirrel-cage winding connecting the two stator elements, a driven rotor member having two mechanically connected rotor elements arranged concentrically of the stator elements, a squirrel-cage winding connecting the two rotor elements, the second rotor and stator elements being arranged with their windings in co-active relation; a rotative driving field member arranged between the first rotor and stator elements and having a plurality of pole pieces on one side in inductive relation to the stator winding and a plurality of pole pieces on another side in inductive relation to the rotor winding, magnetic yokes connecting each outer face of the pole pieces of one set with the respectively adjacent inner face of the pole pieces of the other set, a separate field winding for each set of pole pieces wound to form successively opposite poles, means for supplying a weak magnetizing current to each field winding, and means for reversing the magnetizing current of one field winding relative to that of the other.

13. An electro-magnetic power transmission device comprising a stator member having two stator elements, a squirrel-cage winding connecting the two stator elements, a driven rotor member having two mechanically connected rotor elements arranged concentrically of the stator elements, a squirrel-cage winding connecting two rotor elements, the second rotor and stator elements being arranged with their windings in co-active relation; a rotative driving field member arranged between the first rotor and stator elements and having a plurality of pole pieces on one side in inductive relation to the stator winding and a plurality of pole pieces on another side in inductive relation to the rotor winding, magnetic yokes connecting each outer face of the pole pieces of one set with the respectively adjacent inner face of the pole pieces of the other set, a separate field winding for each set of pole pieces wound to form successively opposite poles, means for supplying a weak magnetizing current to each field winding, means for varying the relative strength of the two fields, and means for reversing the magnetizing current of one field winding relative to that of the other.

14. A combined starter, generator and power transmission device comprising a driven rotor member having an induced winding thereon, a stator member having an induced winding thereon arranged in co-active relation to the rotor winding, a driver field member having a stator field component in inductive relation to the stator winding and a rotor field component in inductive relation to the rotor winding, a battery for supplying a magnetizing current to the two field components, means for opening the circuit for the rotor field component, a starter and generator coil on the stator having electrical connection with the battery and with the winding of the stator field component, whereby the stator field and the starting and generating coil may be simultaneously energized from the battery to produce a torque on the driver field member and current will be generated in the coil and supplied to the battery and to the stator and rotor field windings when the driver field member is rotated by a prime mover.

15. A combined starter, generator and power transmission device comprising a driven rotor member having an induced winding thereon, a stator member having an induced winding thereon arranged in co-active relation to the rotor winding, a driver field member having a stator field component in inductive relation to the stator winding and a rotor field component in inductive relation to the rotor winding, a battery for supplying a magnetizing current to the two field components, means for opening the circuit for the rotor field component, means for adjusting the strength of the two field components and for reversing the magnetizing current of one of the field components, a starter and generator coil on the stator having electrical connection with the battery and with the winding of the stator field component, whereby the stator field and the starting and generating coil may be simultaneously energized from the battery to produce a torque on the driver field member and current will be generated in the coil and supplied to the battery and to the stator and rotor field windings when the driver field member is rotated by a prime mover.

In witness whereof, I subscribe my signature in the presence of two witnesses.

ALFONS H. NEULAND.

Witnesses:
VICTOR D. BORST,
WALDO M. CHAPIN.